(12) United States Patent
Omori

(10) Patent No.: US 10,753,721 B2
(45) Date of Patent: Aug. 25, 2020

(54) THREADED SHAFT MEASURING DEVICE, THREADED SHAFT MEASURING METHOD, AND ADJUSTMENT JIG

(71) Applicant: MITUTOYO CORPORATION, Kanagawa (JP)

(72) Inventor: Yoshiyuki Omori, Higashihiroshima (JP)

(73) Assignee: MITUTOYO CORPORATION, Kanagawa (JP)

(*) Notice: Subject to any disclaimer, the term of this patent is extended or adjusted under 35 U.S.C. 154(b) by 230 days.

(21) Appl. No.: 16/052,109

(22) Filed: Aug. 1, 2018

(65) Prior Publication Data
US 2019/0049229 A1    Feb. 14, 2019

(30) Foreign Application Priority Data
Aug. 14, 2017   (JP) ................... 2017-156391

(51) Int. Cl.
G01B 5/16    (2006.01)
G01B 5/20    (2006.01)
G01B 5/008   (2006.01)

(52) U.S. Cl.
CPC ............. *G01B 5/204* (2013.01); *G01B 5/008* (2013.01)

(58) Field of Classification Search
CPC .................................................. G01B 5/204
USPC ........................................................ 33/199 R
See application file for complete search history.

(56) References Cited

U.S. PATENT DOCUMENTS

| | | | | |
|---|---|---|---|---|
| 3,844,046 A | * | 10/1974 | Johnson | G01B 5/0002 33/199 R |
| 4,947,555 A | * | 8/1990 | Allen, III | G01B 3/36 33/199 R |
| 5,646,724 A | * | 7/1997 | Hershline | G01N 21/952 250/223 R |
| 2003/0101602 A1 | * | 6/2003 | Galestien | G01B 5/204 33/199 R |
| 2007/0240318 A1 | * | 10/2007 | Matsumiya | G01B 5/204 33/199 R |
| 2011/0164244 A1 | * | 7/2011 | Honda | G01B 11/2433 356/72 |
| 2014/0107973 A1 | | 4/2014 | Omori | |
| 2017/0097221 A1 | * | 4/2017 | Hidaka | G01B 5/012 |

FOREIGN PATENT DOCUMENTS

JP            6093538 B2    3/2017

* cited by examiner

*Primary Examiner* — George B Bennett
(74) *Attorney, Agent, or Firm* — Greenblum & Bernstein, P.L.C.

(57) ABSTRACT

A threaded shaft measuring device includes a table that supports a threaded shaft to be measured, and that is capable of adjusting a rotation position about a perpendicular Z axis, adjusting a rotation position about an X axis that is horizontal and intersects with the Z axis, and adjusting a position in a Y axis direction that is horizontal and intersects with the X axis; and a stylus that performs scanning measurement of a surface of the threaded shaft. An adjustment jig capable of making contact with the threaded shaft and an elevator that brings the adjustment jig into contact with the threaded shaft are installed on the table. The adjustment jig includes an abutting bottom surface; an abutting side surface; a measurement surface; and an axis line marker that enables a tilt relative to the X axis to be detected.

6 Claims, 11 Drawing Sheets

THREADED SHAFT MEASURING DEVICE, THREADED SHAFT MEASURING METHOD, AND ADJUSTMENT JIG

CROSS-REFERENCE TO RELATED APPLICATIONS

The present application claims priority under 35 U.S.C. § 119 of Japanese Application No. 2017-156391, filed on Aug. 14, 2017, the disclosure of which is expressly incorporated by reference herein in its entirety.

BACKGROUND OF THE INVENTION

1. Field of the Invention

The present invention relates to a threaded shaft measuring device, threaded shaft measuring method, and adjustment jig, and relates to measuring various characteristic values of a threaded shaft.

2. Description of Related Art

Conventionally, various characteristic values (pitch of thread peaks and valleys, effective diameter, and so on) are used to specify a thread shape of a threaded shaft. These characteristic values are laid out for each type of screw in the Japanese Industrial Standards (JIS). For example, the standard JIS B 0205 stipulates various characteristic values for a generic metric screw thread. In this example, the characteristic values for the shape of the thread are laid out as a profile shape of thread peaks that appear in a cross-sectional shape viewed along a plane running through a center axis of the threaded shaft.

Conventionally, the three wire method is frequently used in the measurement of a threaded shaft. The three wire method is a measurement method defined in JIS B 0261, for example, and calculates the effective diameter of a threaded shaft, for example, by suspending one measurement wire on one side of the threaded shaft and two measurement wires on the opposite side of the threaded shaft, placed between thread peaks, and measuring an external dimension of the measurement wires with a micrometer or the like. In the conventional three wire method, the protocol from preparing the measurement wires through placing the wires relative to the threaded shaft, measurement, and calculation is cumbersome. Given this, a method of measuring various characteristic values of a threaded shaft has been proposed that makes use of a coordinate measuring device or a uniaxial displacement-type form measuring device.

When using a coordinate measuring device to measure a threaded shaft, scanning measurement must be repeatedly performed at a plurality of locations, and the complexity of the apparatus and process are inescapable. On the other hand, the complex apparatus and process of measuring with a coordinate measuring device can be simplified by performing scanning measurement of the shape of a thread using a uniaxial displacement-type form measuring device individually at positions on opposite sides of the center axis line of the threaded shaft from each other. However, when scanning measurement is performed individually at opposite positions on the threaded shaft, a "through-feed" adjustment and "vertex finding" adjustment that accurately match up the center axis line of the threaded shaft and a scanning axis line of the form measuring device (displacement axis line of the scanning measurement, trace trajectory) become necessary.

"Through-feed," also referred to as leveling, is an operation that makes adjustments such that the scanning axis line and the center axis line of the threaded shaft are parallel, which requires extremely cumbersome work such as inferring the center axis line through trial and error. "Vertex finding," also referred to as peak/bottom detection, infers positions on opposite sides of the center axis line (two positions enabling the diameter to be detected) by detecting a peak (uppermost point) and bottom (lowermost point) in a cross-section of the threaded shaft (plane intersecting the center axis line). A moderately cumbersome process is unavoidable.

In response, a thread shape measuring method has been proposed that can achieve accuracy with a simple apparatus and process based on independent knowledge that, when performing a scanning measurement of a threaded shaft, an amount of tilt of a scanning axis line relative to the center axis line of the threaded shaft (amount to be adjusted by through-feed adjustment) and an amount of offset (amount to be adjusted by vertex finding adjustment) can be calculated by detecting an amount of displacement along the center axis line for a thread peak and valley on opposite sides of the center axis line at two points on the scanning axis line (see Japanese Patent No. 6,093,538).

In the thread shape measuring method published in Japanese Patent No. 6,093,538, scanning measurement of the threaded shaft is individually performed on each of a first axis line and a second axis line (for example, top and bottom of the threaded shaft) that lie along the center axis line of the threaded shaft and are located on opposite sides of the center axis line from each other, and profile shape data is acquired. Then, at each of a first position and second position on the center axis line, an amount of displacement along the center axis line between the thread peak on the first axis line side and the valley on the second axis line side is detected and defined as an amount of thread peak displacement, and an amount of tilt relative to the center axis line of the first axis line and second axis line and an amount of offset are each calculated from the detected amount of thread peak displacement at each of the first position and the second position. A posture of the threaded shaft that is undergoing scanning measurement is adjusted so as to cancel out the amount of tilt and amount of offset, which enables the through-feed and vertex finding to be performed simply and with a high degree of accuracy.

In the thread shape measuring method published in Japanese Patent No. 6,093,538, scanning measurement of the threaded shaft must be individually performed on each of the first axis line and the second axis line (for example, top and bottom of the threaded shaft) that lie along the center axis line of the threaded shaft and are located on opposite sides of the center axis line from each other, and profile shape data acquired. Therefore, Japanese Patent No. 6,093,538 achieves scanning measurement of the top and bottom of the threaded shaft using a form measuring device having upward-facing and downward-facing styluses, with the threaded shaft (measured object) fixed in place. However, a form measuring device that is capable of scanning measurement in both upward and downward directions may have a higher equipment cost, for example, than an ordinary form measuring device that performs scanning measurement in a single direction. In view of this, carrying out the thread shape measuring method published in Japanese Patent No. 6,093,538 using an ordinary form measuring device that performs scanning measurement in a single direction has been attempted.

One solution may be, for example, after performing scanning measurement of the first axis line with the form measuring device, to flip the threaded shaft top to bottom about the center axis line and perform scanning measurement of the second axis line in this state. However, this method requires moving the threaded shaft, which allows the possibility for a measurement error to arise in the scanning measurements of the first axis line and second axis line. In addition, with a large threaded shaft, for example, there is also the possibility that the operation of rotating and re-affixing the threaded shaft may be cumbersome. Another solution may be, for example, a method in which the threaded shaft is fixated and the scanning measurement is performed from above and below by two form measuring devices. After scanning measurement of the threaded shaft from above with one form measuring device, the form measuring device could also be shifted and scanning measurement of the threaded shaft could be performed from below. However, there are difficulties attendant on preparing two form measuring devices, and further difficulties in inverting the posture of one form measuring device. Therefore, achieving the above-described method published in Japanese Patent No. 6,093,538 using an ordinary form measuring device that performs scanning measurement in a single direction is difficult, and a new method has been sought that is capable of performing through-feed and vertex finding simply and with a high degree of accuracy.

SUMMARY OF THE INVENTION

The present invention provides a threaded shaft measuring device, threaded shaft measuring method, and adjustment jig having a simple apparatus and process and capable of achieving a high degree of accuracy.

A threaded shaft measuring device according to the present invention includes a table that supports a threaded shaft to be measured, and that is capable of adjusting a rotation position about a perpendicular Z axis, adjusting a rotation position about an X axis that is horizontal and intersects with the Z axis, and adjusting a position in a Y axis direction that is horizontal and intersects with the X axis; a base that supports the table; a head supported on a column that stands upright from the base; an arm supported by the head and capable of displacing in the horizontal X axis direction; and a stylus that is installed on the arm and that performs scanning measurement of a surface of the threaded shaft. An adjustment jig capable of making contact with the threaded shaft and an elevator mechanism that brings the adjustment jig into contact with the threaded shaft are installed on the table. The adjustment jig includes an abutting bottom surface that is capable of making contact with the threaded shaft from below; an abutting side surface that is capable of making contact with the threaded shaft from the side; a measurement surface that is installed at a predetermined height from and is parallel to the abutting bottom surface; and an axis line marker that enables a tilt relative to the X axis to be detected.

When performing measurement of the threaded shaft with the threaded shaft measuring device according to the present invention, the threaded shaft is supported on the table, and the elevator mechanism either raises the adjustment jig or lowers the threaded shaft relative to the adjustment jig, which causes the adjustment jig and the threaded shaft to approach each other and brings the abutting bottom surface into contact with the threaded shaft from below, and also brings the abutting side surface into contact with the threaded shaft from the side. In this state, the height of the measurement surface is measured and, in addition, a plurality of points on the axis line marker are measured and the tilt of the adjustment jig relative to the X axis is detected, and through-feed adjustment is performed based on the detected tilt. Next, the elevator mechanism moves the adjustment jig away from the threaded shaft, scanning measurement of the top side of the threaded shaft is performed in the X axis direction, and vertex finding adjustment is performed based on an amount of offset in the Y axis direction, after which the scanning measurement is performed once again and profile shape data for the threaded shaft is acquired from the scanning measurement results and the height of the abutting bottom surface calculated from the height of the measurement surface.

In the present invention configured in this way, by applying the adjustment jig to the threaded shaft, a position equivalent to an outer diameter on the bottom side can be measured based on the top side of the threaded shaft. The top and bottom sides of the threaded shaft are basically identical, and therefore when profile shape data for the top side of the threaded shaft is obtained through scanning measurement of the top side of the threaded shaft, profile shape data for the bottom side of the threaded shaft can also be established based on the outer diameter on the bottom side of the threaded shaft. Accordingly, the scanning measurement of the threaded shaft can be completed with measurement of only the top side. For the through-feed adjustment necessary for measuring the threaded shaft, the tilt can be detected and adjusted by measuring only from the top, using the axis line marker formed in the adjustment jig. For the vertex finding adjustment, an amount of offset can be calculated and adjusted from the result of the scanning measurement of the top side of the threaded shaft. Therefore, according to the present invention, using the form measuring device that is capable of performing scanning measurement in a single direction and the adjustment jig having a simple structure, measurement of the threaded shaft can be performed with only a scanning measurement from the top side, following through-feed adjustment and vertex finding adjustment. Then, highly accurate threaded shaft measurement results can be obtained with a simple apparatus and process, without requiring a high-priced form measuring device that is capable of performing scanning measurement in both upward and downward directions.

In the threaded shaft measuring device according to the present invention, preferably, the adjustment jig is a member having substantially a "C" shape in cross-section, with a lower flange portion and an upper flange portion connected by a web portion. The abutting bottom surface is formed by a flat top surface of the lower flange portion, the abutting side surface is formed by a flat inner surface of the web portion, and the measurement surface is formed by a flat top surface of the upper flange portion.

In the present invention, the required abutting bottom surface, abutting side surface, and measurement surface can be achieved with a simple configuration in the form of the adjustment jig. Such a member can be easily cut out of, for example, a long metal source material having substantially a "C" shape in cross-section, and sufficient rigidity and accuracy can be ensured.

In the threaded shaft measuring device according to the present invention, preferably, the axis line marker is a recessed or projecting portion formed on the measurement surface, and the recessed or projecting portion is continuous or arrayed along an axis line that is parallel to the abutting side surface (scanning measurement axis line that extends in the X axis direction).

In the present invention, a V-shaped groove can be used as an exemplary recessed portion that is continuous in a predetermined axis line direction. An example of a continuous projecting portion can be configured by a projecting portion that is triangular in cross-section. An example of a recessed or projecting portion that is arrayed along the predetermined axis line can be configured by the V-shaped groove or the projecting portion mentioned above provided at intervals in at least two positions. Such a shape includes an inclined surface that individually lies along the predetermined axis line direction, and allows the tilt relative to the X axis direction to be detected using the fact that when X axis positions differ despite having the same Y axis position, there is a discrepancy in the Z axis height (corresponding to the tilt). Of the axis line markers noted here, the continuous recessed portion that is a V-shaped groove or the like can be easily formed through machining or the like.

A threaded shaft measuring method according to the present invention uses a table that supports a threaded shaft to be measured, and that is capable of adjusting a rotation position about a perpendicular Z axis, adjusting a rotation position about an X axis that is horizontal and intersects with the Z axis, and adjusting a position in a Y axis direction that is horizontal and intersects with the X axis; an adjustment jig having an abutting bottom surface that is capable of making contact with the threaded shaft from below, an abutting side surface that is capable of making contact with the threaded shaft from the side, a measurement surface that is installed at a predetermined height from and is parallel to the abutting bottom surface, and an axis line marker that enables a tilt relative to the X axis to be detected; and an elevator mechanism that is installed on the table and brings the adjustment jig into contact with the threaded shaft. In the method, the threaded shaft is supported on the table; the elevator mechanism causes the adjustment jig and the threaded shaft to approach each other and brings the abutting bottom surface into contact with the threaded shaft from below, and also brings the abutting side surface into contact with the threaded shaft from the side, a height of the measurement surface is measured, and also a plurality of points on the axis line marker are measured and the tilt of the adjustment jig relative to the X axis is detected, and through-feed adjustment is performed based on the detected tilt; the elevator mechanism moves the adjustment jig away from the threaded shaft; scanning measurement of the top side of the threaded shaft is performed in the X axis direction, and vertex finding adjustment is performed based on an amount of offset in the Y axis direction, after which the scanning measurement is performed once again and profile shape data for the threaded shaft is acquired from the scanning measurement results and a height of the abutting bottom surface calculated from the height of the measurement surface.

With the threaded shaft measuring method according to the present invention, the effects described above for the threaded shaft measuring device according to the present invention can be obtained.

An adjustment jig according to the present invention is an adjustment jig used in the threaded shaft measuring method of the present invention, described above, and includes the abutting bottom surface that is capable of making contact with the threaded shaft from below; the abutting side surface that is capable of making contact with the threaded shaft from the side; the measurement surface that is installed at the predetermined height from and is parallel to the abutting bottom surface; and the axis line marker that enables the tilt relative to the X axis to be detected.

With the adjustment jig according to the present invention, the effects described above for the threaded shaft measuring device according to the present invention can be obtained using the above-described threaded shaft measuring method according to the present invention.

According to the present invention, a threaded shaft measuring device, threaded shaft measuring method, and adjustment jig can be provided that have a simple apparatus and process and that are capable of achieving a high degree of accuracy.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
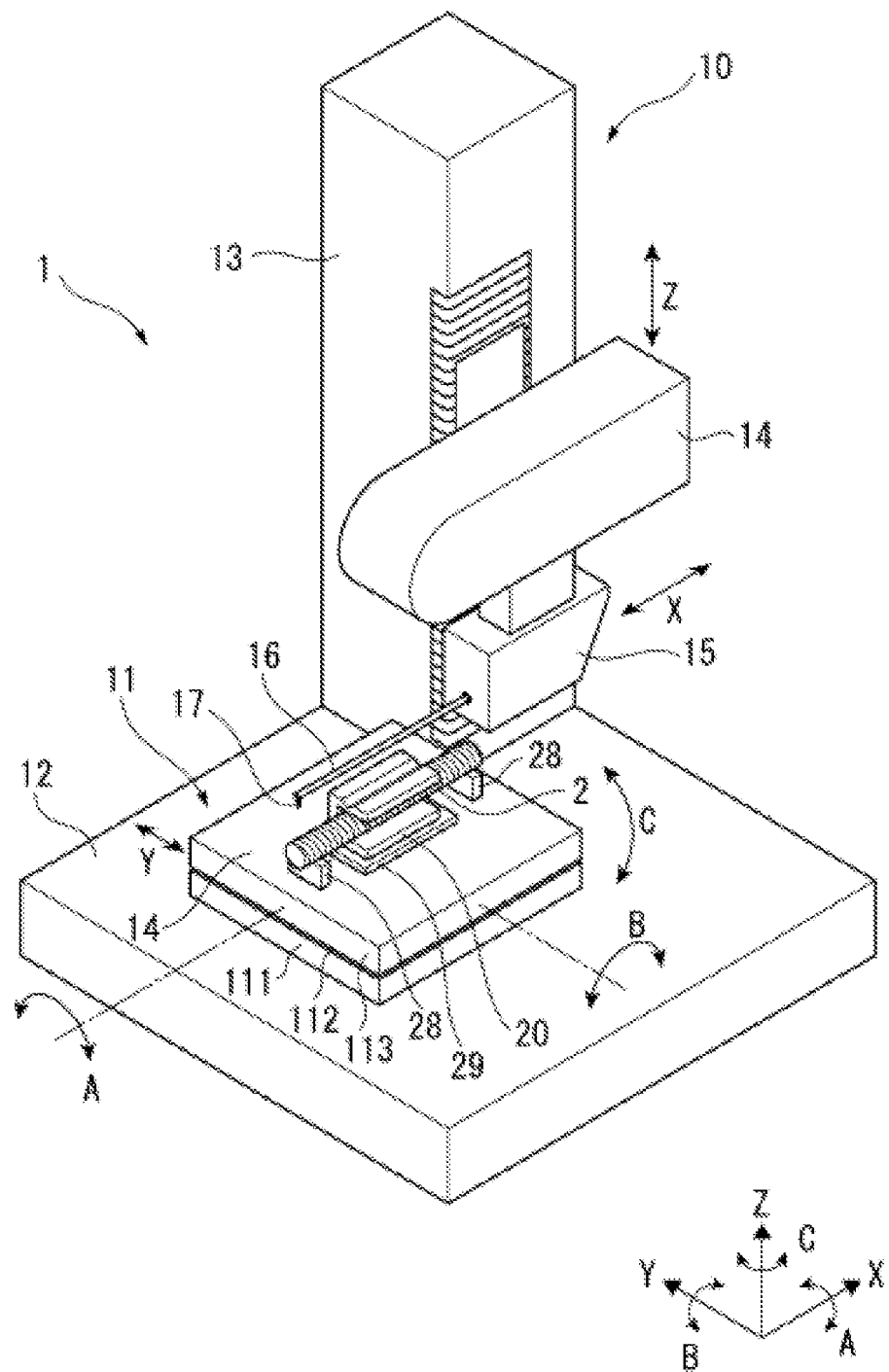
FIG. 1 is a perspective view of a threaded shaft measuring device according to a first embodiment of the present invention.

Hereafter, an embodiment of the present invention is described with reference to the drawings. A threaded shaft measuring device 1 in FIG. 1 performs a form measurement of a threaded shaft 2 that is to be measured. The threaded shaft measuring device 1 has as a basic structure a form measuring device 10 which performs scanning measurement in a single direction. To a table 11, the threaded shaft measuring device 1 adds an adjustment jig 20, an elevator mechanism (elevator) 29, and a support device (support) 28.

The form measuring device 10 includes a base 12 that supports the table 11 and a column 13 that stands upright from the base 12. A head 15 is supported on the column 13 via a Z slider 14 so as to be freely lifted and lowered. An arm 16 is supported on the head 15, and the arm 16 is capable of oscillating about a Y axis due to an oscillation mechanism (not illustrated in the drawings) on the interior of the head 15. A stylus 17 is installed, facing downward, on a foremost end of the arm 16 and is capable of making contact from above with a measured object such as the threaded shaft 2 or the adjustment jig 20. The head 15 is capable of displacing in an X axis direction relative to the Z slider 14, and by displacing the stylus 17 in the X axis direction while the stylus 17 is in contact with the measured object, the arm 16 oscillates in response to a surface form of the measured object, allowing scanning measurement of a top surface side of the measured object.

The table 11 supports a stage 113 above a stand 111, via a posture adjustment mechanism 112, and a top surface of the stage 113 is referred to as a placement surface 114. The posture adjustment mechanism 112 includes a mechanism that performs various adjustments of the posture of the stage 113 relative to the stand 111. Examples of the posture adjustments that can be made include adjusting a Y axis direction position that is horizontal and intersects with the X axis, adjusting an angle (A axis) about the X axis, adjusting an angle (B axis) about the Y axis, and adjusting an angle (C axis) about the perpendicular Z axis. By making these posture adjustments, the measured object supported on the placement surface 114 can be appropriately set in a posture relative to a displacement direction along a scanning measurement axis line of the stylus 17. In the relative positions of the measured object and the stylus 17, the position in the X axis direction is established by a scanning measurement action, and a height in the Z axis direction is established by lifting or lowering the Z slider 14 relative to the column 13.

Figure 2:
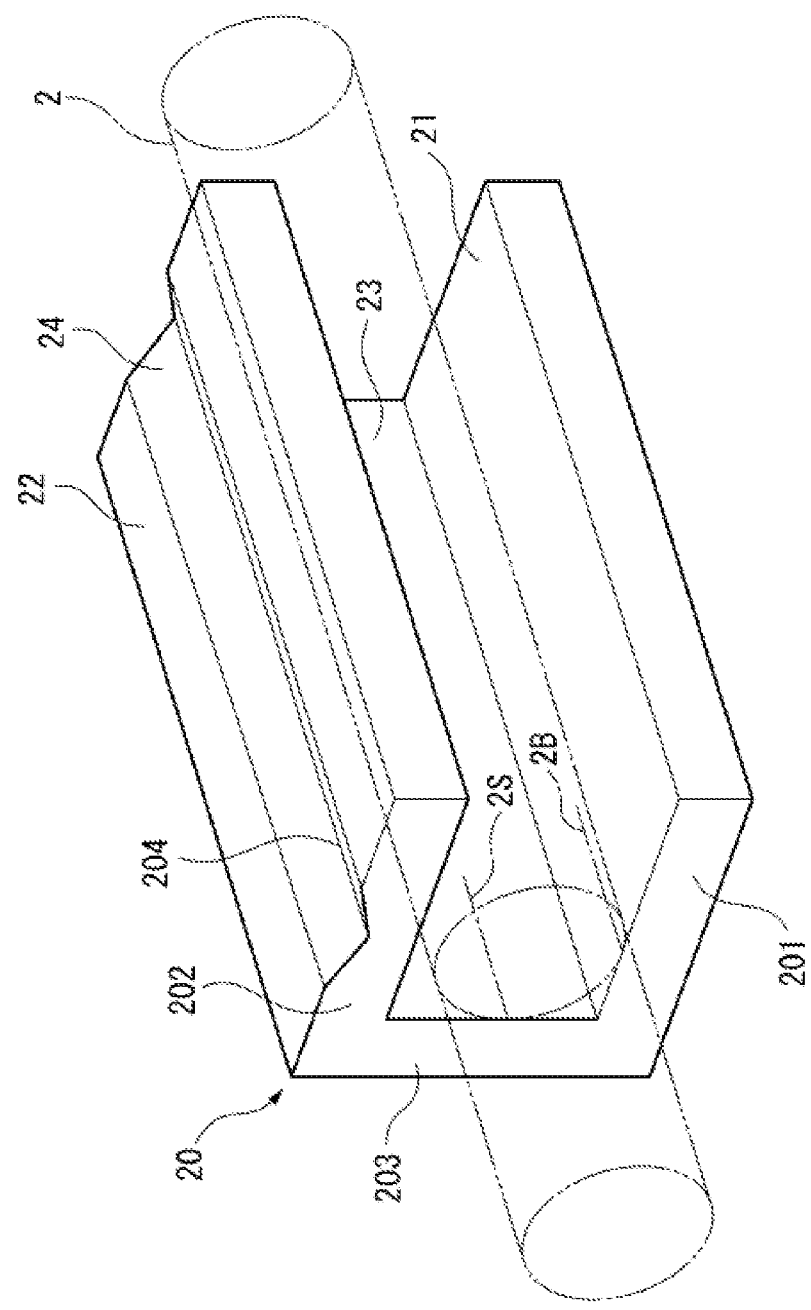
FIG. 2 is a perspective view illustrating an adjustment jig according to the embodiment.

As noted above, the adjustment jig 20, the elevator mechanism 29, and the support device 28 are added to the table 11. The adjustment jig 20 in FIG. 2 is a member having substantially a "C" shape in cross-section, with a lower flange portion 201 and an upper flange portion 202 connected by a web portion 203. The adjustment jig 20 may be formed of a metal or ceramic material, for example.

An abutting bottom surface 21 is formed on a flat top surface of the lower flange portion 201. When the threaded shaft 2 is introduced into the adjustment jig 20, the abutting bottom surface 21 is capable of abutting a leading end (along an imaginary line 2B) of each thread peak on a bottom surface side of the threaded shaft 2. A measurement surface 22 is formed on a flat top surface of the upper flange portion 202. The measurement surface 22 is at a predetermined height position from the abutting bottom surface 21, and is parallel thereto.

An abutting side surface 23 is formed on a flat inner surface of the web portion 203. The abutting side surface 23 is perpendicular to the abutting bottom surface 21. By displacing the threaded shaft 2 sideways while the threaded shaft 2 is in contact with the abutting bottom surface 21, the abutting side surface 23 can abut a leading end (along an imaginary line 2S) of each thread peak (position offset by 90° from the location in contact with the abutting bottom surface 21) on a side surface of the threaded shaft 2.

A V-shaped groove 204 that extends in a direction parallel to the abutting side surface 23 is formed in the measurement surface 22, and an axis line marker 24 is formed by a pair of inclined surfaces formed inside the V-shaped groove 204. In a state where the threaded shaft 2 abuts the abutting bottom surface 21 and the abutting side surface 23, the center axis line of the threaded shaft 2 and a procession direction of the axis line marker 24 are parallel.

Returning to FIG. 1, the adjustment jig 20 is supported on the table 11 via the elevator mechanism 29. The elevator mechanism 29 is formed in a thin plate shape and can raise and lower the adjustment jig 20 relative to the surface of the table 11 by increasing and decreasing the thickness of a piezoelectric element (not shown in the drawings) installed on an interior of the elevator mechanism 29 by controlling voltage applied to the piezoelectric element, for example. The elevator mechanism 29 may also be a mechanical elevator mechanism, for example, in which a structure increasing and decreasing the thickness using hydraulic fluid or the like supplied from an exterior is driven by a motor.

On the table 11, a middle portion of the threaded shaft 2 to be measured is introduced into the adjustment jig 20 and the two ends of the threaded shaft 2 are supported by a pair of support devices 28. The support devices 28 are block-shaped members installed on the top surface of the table 11, and V-shaped indentations formed in the top surfaces thereof prevent the threaded shaft 2 from rolling. In a state where the adjustment jig 20 is lowered by the elevator mechanism 29, the threaded shaft 2 supported by the support devices 28 is away from the abutting bottom surface 21, but may be brought into contact with the abutting bottom surface 21 with a predetermined force by raising the adjustment jig 20 with the elevator mechanism 29.

Figure 3:
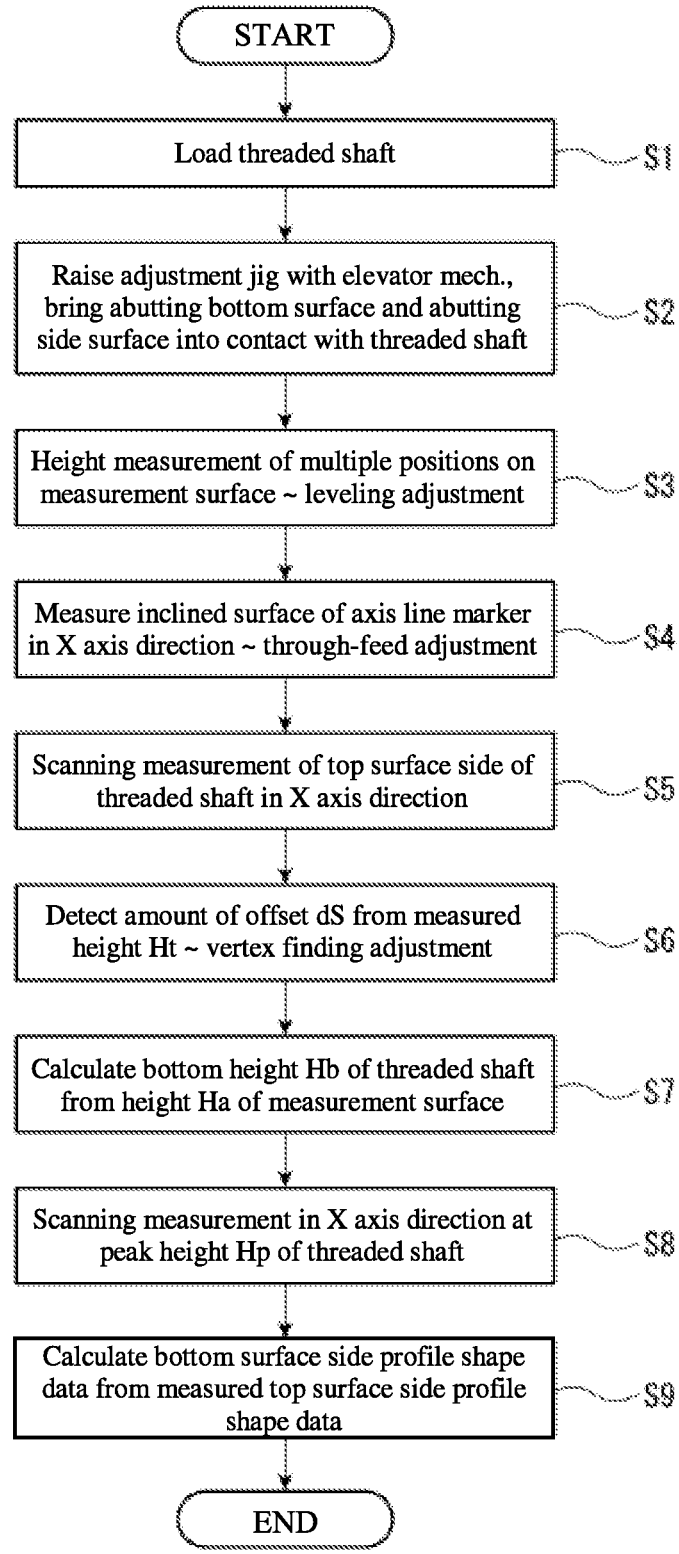
FIG. 3 illustrates a procedural flow of a method of measuring a threaded shaft in the embodiment.

FIG. 3 illustrates a procedure of measuring a threaded shaft according to the present embodiment. FIGS. 4 to 10 illustrate states of the threaded shaft 2, the form measuring device 10, and the adjustment jig 20 in each stage of the measurement procedure illustrated in FIG. 3.

Figure 4:
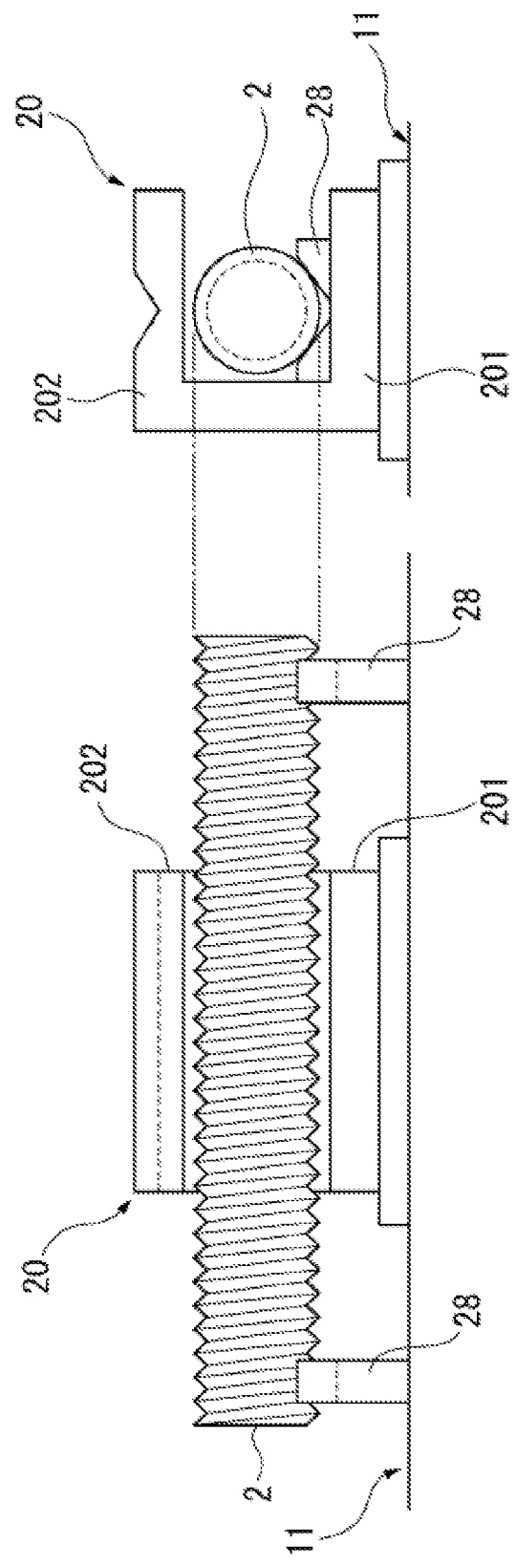
FIG. 4 is a schematic view of a process of loading the threaded shaft in the embodiment.

First, at the time of measurement, as illustrated in FIG. 4, the threaded shaft 2 to be measured is loaded on the table 11 (process S1 of FIG. 3). When loading the threaded shaft 2, the middle portion of the threaded shaft 2 is introduced between the lower flange portion 201 and the upper flange portion 202 from the lateral direction of the adjustment jig 20, and areas near the two ends of the threaded shaft 2 are supported by the pair of support devices 28.

Figure 5:
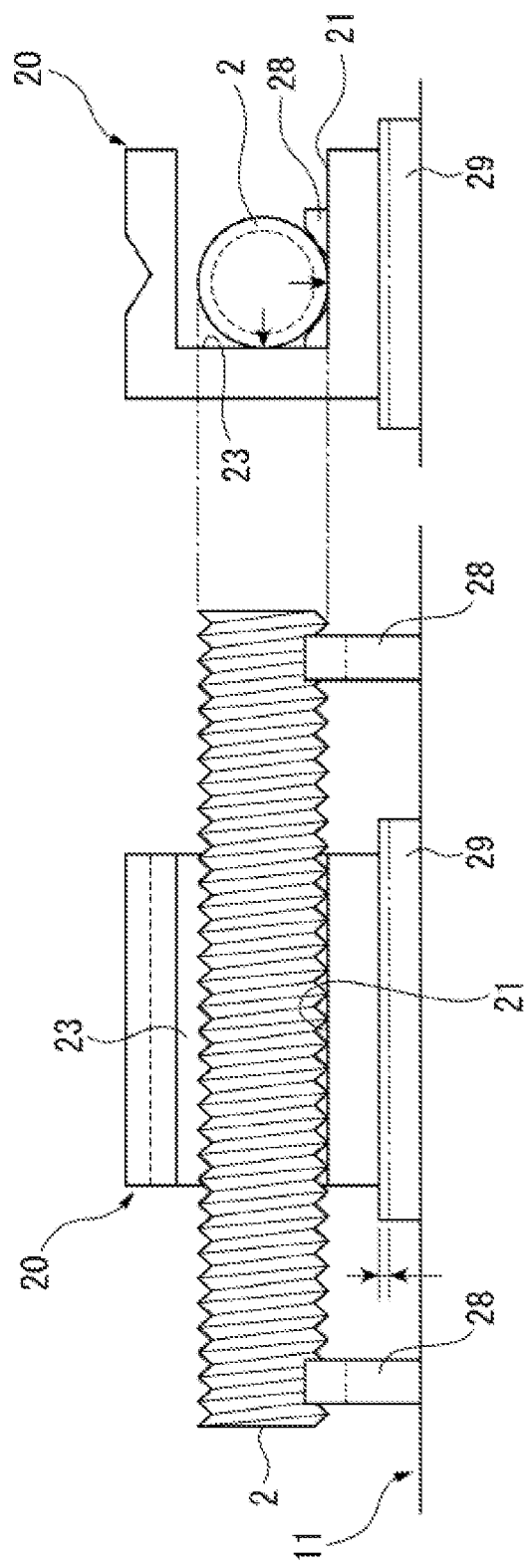
FIG. 5 is a schematic view of a process of bringing the threaded shaft into contact with the adjustment jig in the embodiment.

Next, as illustrated in FIG. 5, the adjustment jig 20 is raised by the elevator mechanism 29 and the middle portion of the threaded shaft 2 is brought into contact with the abutting bottom surface 21 and the abutting side surface 23 (process S2 of FIG. 3). The contact between the threaded shaft 2 and the abutting bottom surface 21 is carried out automatically by raising the adjustment jig 20. The raising of the adjustment jig 20 is preferably controlled such that the state of contact between the threaded shaft 2 and the abutting bottom surface 21 remains constant. This may be performed by, for example, detecting electrification at the site of contact or by monitoring a load applied to the support devices 28. The contact between the threaded shaft 2 and the abutting side surface 23 is not carried out by raising the adjustment jig 20, and therefore a worker displaces the threaded shaft 2 toward the abutting side surface 23. A mechanism to displace the threaded shaft 2 sideways, for example, may also be added.

Figure 6:
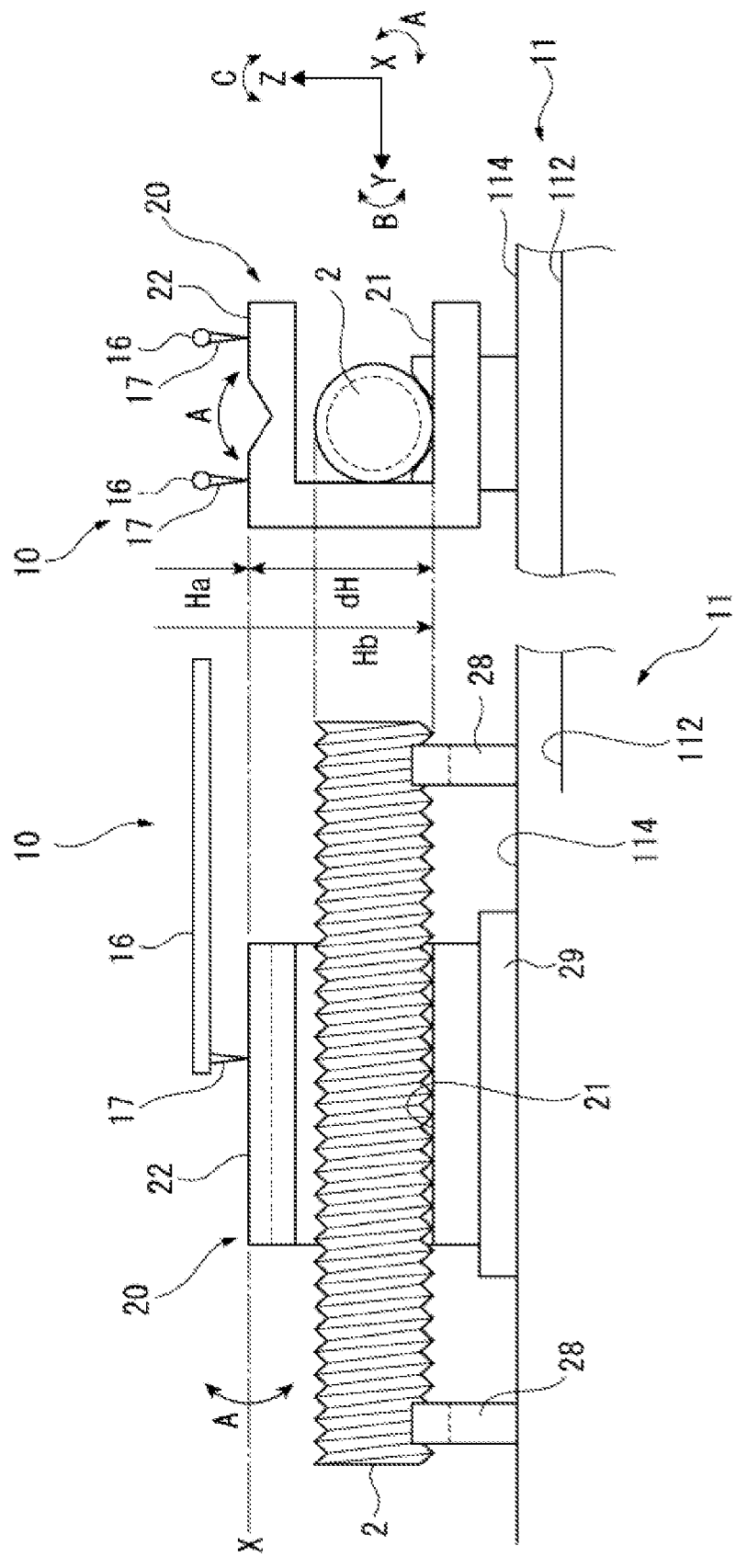
FIG. 6 is a schematic view illustrating a leveling adjustment in the embodiment.

Next, as illustrated in FIG. 6, the form measuring device 10 is activated and the arm 16 and stylus 17 are brought in close above the adjustment jig 20, a height measurement is performed for a plurality of positions on the measurement surface 22, and a leveling adjustment is carried out on the basis of the results of the height measurements (process S3 of FIG. 3). Examples of the plurality of positions of the measurement surface 22 where the height is measured may include two positions separated from each other in the Y axis direction, ensuring that at least the Y axis direction is level. A specific example of the leveling adjustment may be to calculate a Y axis direction tilt of the measurement surface 22 based on the height measurement results of the two positions separated from each other in the Y axis direction, activate the posture adjustment mechanism 112 of the table 11 so as to make the Y axis direction tilt level, and rotate (A axis rotation) the placement surface 114 slightly about the X axis. The leveling adjustment may also detect two positions separated from each other in the X axis direction and rotate (B axis rotation) the placement surface 114 slightly about the Y axis using the posture adjustment mechanism 112 to ensure that the X axis direction is level. Because a final scanning measurement of the threaded shaft 2 lies along the X axis direction and the form measuring device 10 can correct an X axis direction tilt with measurement data processing, X axis direction leveling may also be omitted.

In FIG. 6, in a state where the leveling adjustment has been performed, the measurement surface 22 can be leveled and, simultaneously, the abutting bottom surface 21 can also be leveled. Accordingly, when height is measured at any position on the measurement surface 22, a height Ha of the measurement surface 22 can be obtained and, by reference to a difference dH between the measurement surface 22 and the abutting bottom surface 21 that was measured ahead of time, a height Hb of the abutting bottom surface 21 can by calculated by Hb=Ha−dH. In a real-world process, the measurement of the height Ha of the measurement surface 22 and the calculation of the height Hb are performed in a state where position adjustment of the threaded shaft 2 has been completed (process S7 of FIG. 3), including through-feed (process S4 of FIG. 3) and vertex finding (process S6 of FIG. 3), described below.

Figure 7:
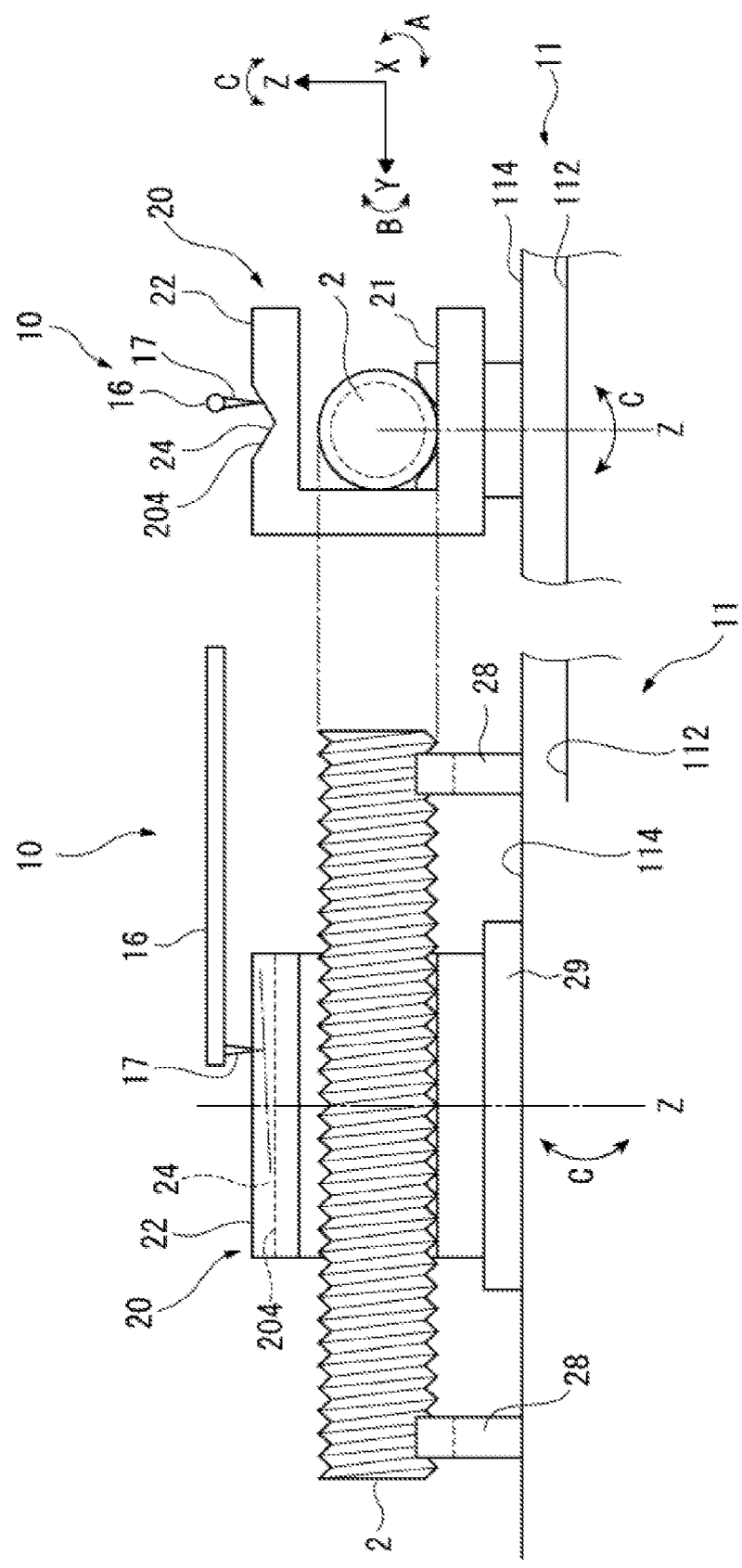
FIG. 7 is a schematic view illustrating a through-feed adjustment in the embodiment.

Next, as illustrated in FIG. 7, the form measuring device 10 is activated and the inclined surfaces of the axis line marker 24 formed on the measurement surface 22 are measured in the X axis direction by the stylus 17, and a through-feed adjustment is carried out on the basis of the results of the measurement (process S4 of FIG. 3). The measurement of the axis line marker 24 may simply be a height measurement of at least two X axis direction positions on one of the inclined surfaces of the V-shaped groove 204, but may also be a scanning measurement of both inclined surfaces in the X axis direction. From a difference in the obtained X axis direction heights, a tilt (angular position about the Z axis, i.e., C axis) of the level surface (XY plane) of the axis line marker 24 can be detected. A specific example of the through-feed adjustment may be to activate, based on the detected tilt of the level surface of the axis line marker 24, the posture adjustment mechanism 112 of the table 11 and rotate (C axis rotation) the placement surface 114 slightly about the Z axis such that the axis line marker 24 lies along the X axis direction.

Figure 8:
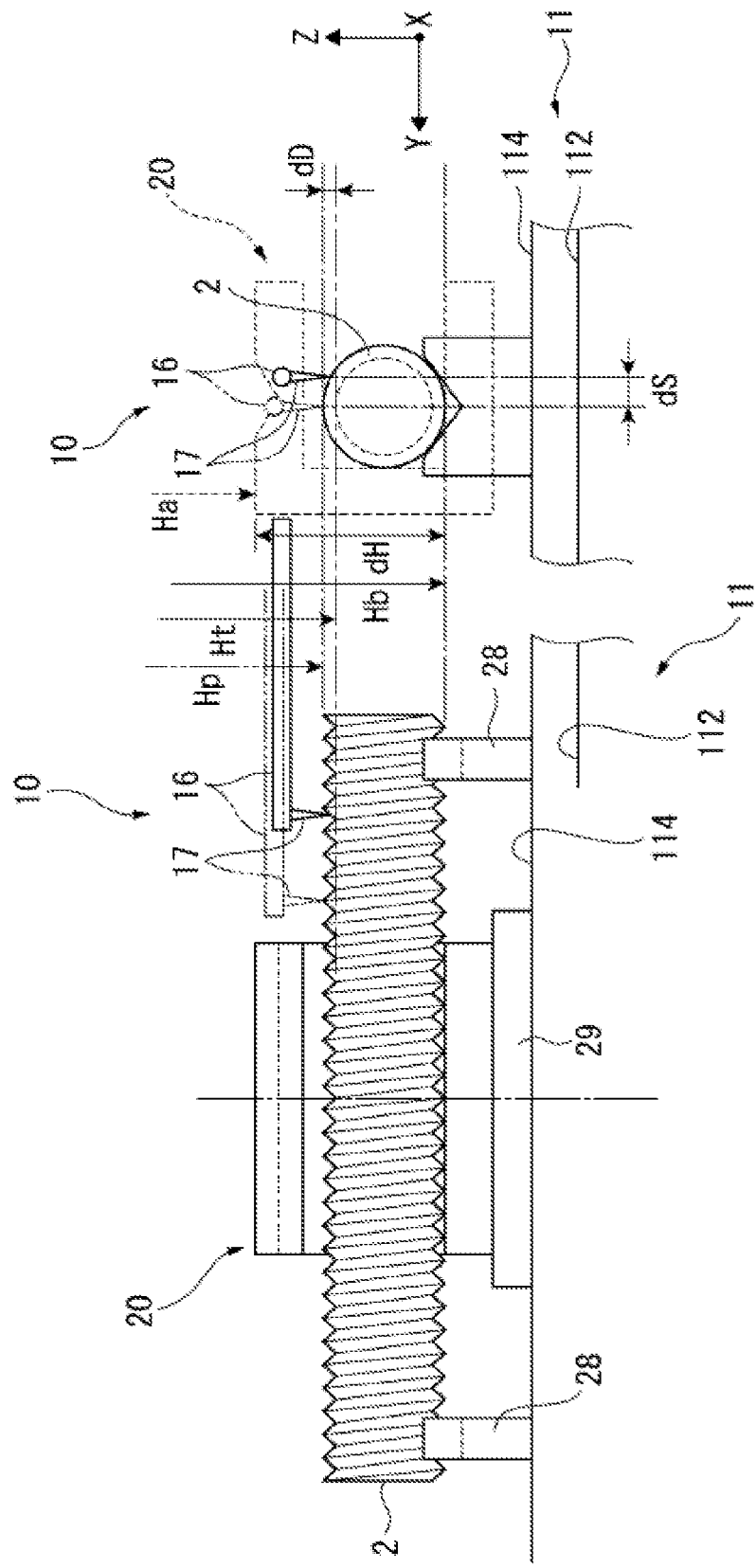
FIG. 8 is a schematic view illustrating a vertex finding adjustment in the embodiment.

When the through-feed adjustment is done, as illustrated in FIG. 8, the form measuring device 10 is activated and a scanning measurement (preliminary measurement) of the top surface side of the threaded shaft 2 in the X axis direction is performed by the stylus 17 (process S5 of FIG. 3). The scanning measurement of the top surface side of the threaded shaft 2 may be performed at a site on the threaded shaft 2 not covered by the adjustment jig 20. In a case where scanning measurement is performed at a site on the threaded shaft 2 covered by the adjustment jig 20, as well, the elevator mechanism 29 may be lowered, the adjustment jig 20 pulled out laterally and removed, and the entire top surface side of the threaded shaft 2 exposed. When the adjustment jig 20 is pulled out, the elevator mechanism 29 may be pulled out along with it. Alternatively, in a case where the threaded shaft 2 is long, for example, the threaded shaft 2 may be displaced in the axis line direction while the elevator mechanism 29 is in a lowered state.

When the scanning measurement is done, as illustrated in FIG. 8, an amount of offset dS is detected from a height Ht and the bottom height Hb during the scanning measurement, and a vertex finding adjustment is performed based on the detection result (process S6 of FIG. 3). At this point, when the scanning measurement is performed on a vertex position of the threaded shaft 2 (depicted by a two-dot-dashed line in FIG. 8), the scanning measurement acquires a peak height Hp of the threaded shaft 2. However, typically, the axis line of the scanning measurement is offset from the vertex of the threaded shaft 2 (amount of offset dS) and the measured height Ht is smaller than the peak height Hp (difference dD). In response, for example, the scanning measurement of process S5 can be performed a plurality of times and the axis line of the scanning measurement that acquired the greatest height can be selected, thereby enabling the axis line to be set to a state where the amount of offset dS=0. Alternatively, the amount of offset dS can be calculated by geometrically computing the amount of offset dS from a Y axis position where the axis line having the greatest height was acquired, a Y axis position of another axis line, and the difference dD in the height of each.

In the vertex finding adjustment, the posture adjustment mechanism 112 of the table 11 is activated, and the scanning axis line of the stylus 17 is displaced by the amount of offset dS in the Y axis direction relative to the threaded shaft 2 or the placement surface 114. When the amount of offset dS is 0, the center axis line of the threaded shaft 2 matches the scanning axis line of the stylus 17, enabling a scanning measurement that passes through the peak height Hp of the threaded shaft 2.

Figure 9:
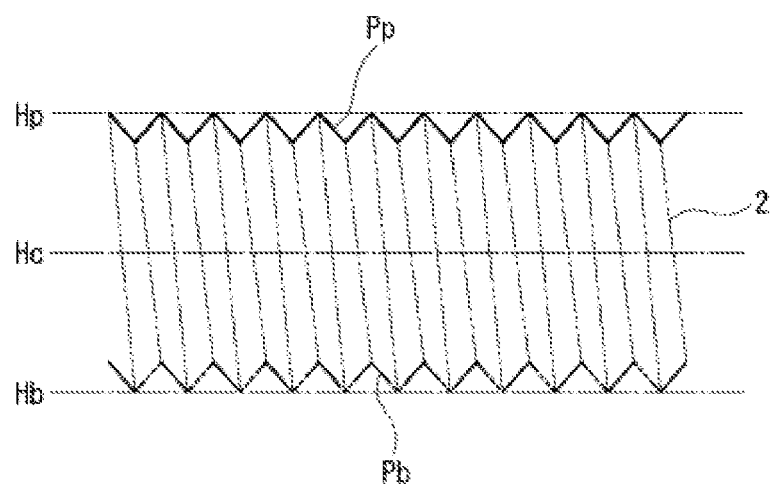
FIG. 9 is a schematic view illustrating processing of profile shape data in the embodiment.
Figure 10:
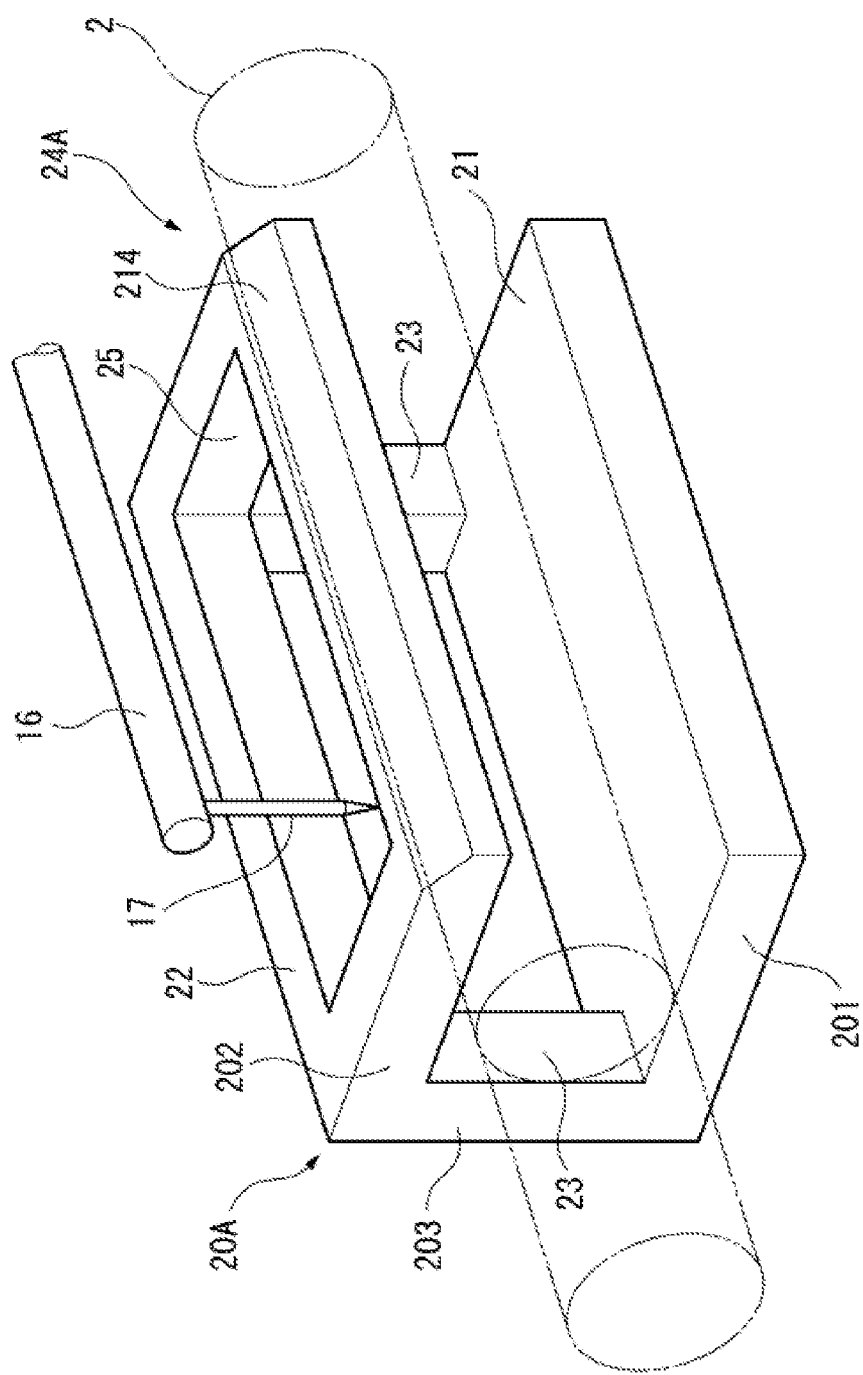
FIG. 10 is a perspective view illustrating an adjustment jig according to another embodiment of the present invention.

When the vertex finding adjustment is done, as illustrated in FIG. 8, the form measuring device 10 is activated, the height Ha of the measurement surface 22 of the adjustment jig 20 is measured, and, by reference to the difference dH of the adjustment jig 20, the height Hb of the abutting bottom surface 21 is calculated by Hb=Ha−dH (process S7 of FIG. 3). Moreover, the stylus 17 is displaced along the scanning axis line that passes through the peak height Hp of the threaded shaft 2 and the scanning measurement ("the measurement") is performed in the X axis direction (process S8 of FIG. 3). In FIG. 9, top surface side profile shape data Pp of the threaded shaft 2 is obtained by the scanning measurement that passes through the peak height Hp of the threaded shaft 2. Bottom surface side profile shape data Pb of the threaded shaft 2 can be calculated by inverting the top surface side profile shape data Pp from top to bottom and offsetting half a pitch in the X axis direction (process S9 of FIG. 3).

Given the above, the leveling adjustment, through-feed adjustment, and vertex finding adjustment can be performed by measuring only the top surface side of the threaded shaft 2 with a downward-oriented stylus 17, and the top surface side profile shape data Pp and bottom surface side profile shape data Pb can be obtained.

According to the present embodiment, by applying the adjustment jig 20 to the threaded shaft 2, a position equivalent to an outer diameter on the bottom side (height Hb of the abutting bottom surface 21) can be measured according to the top side of the threaded shaft 2 (height Ha of the measurement surface 22) (see FIGS. 6 and 8). For the through-feed adjustment necessary for measuring the threaded shaft 2, the tilt (C axis angle position) can be detected and adjusted by measuring only from the top, using the axis line marker 24 formed in the adjustment jig 20 (see FIG. 7). For the vertex finding adjustment, the amount of offset dS can be calculated and adjusted from the result of the scanning measurement of the top side of the threaded shaft 2 (see FIG. 8).

Therefore, according to the present embodiment, using the form measuring device 10 that is capable of performing scanning measurement in a single and the adjustment jig 20 having a simple structure, measurement of the threaded shaft 2 can be performed with only a scanning measurement from the top side, following through-feed adjustment and vertex finding adjustment. Then, the bottom surface side profile shape data Pb can be obtained using the top surface side profile shape data Pp, and highly accurate threaded shaft measurement results can be obtained with a simple apparatus and process, without requiring a high-priced form measuring device that is capable of performing scanning measurement in both upward and downward directions.

In the present embodiment, a member having substantially a "C" shape in cross-section, with the lower flange portion 201 and the upper flange portion 202 connected by the web portion 203, is used as the adjustment jig 20; the abutting bottom surface 21 is formed by the flat top surface of the lower flange portion 201; the measurement surface 22 is formed by the flat top surface of the upper flange portion 202; and the abutting side surface 23 is formed by the flat inner surface of the web portion 203. Therefore, the required abutting bottom surface 21, abutting side surface 23, and measurement surface 22 can be achieved with a simple configuration in the form of the adjustment jig 20. Such a member can be easily cut out of, for example, a long metal source material having substantially a "C" shape in cross-section, and sufficient rigidity and accuracy can be ensured.

In the present embodiment, by forming the axis line marker 24 in the measurement surface 22, the tilt of the adjustment jig 20 and the threaded shaft 2 relative to the X axis direction can be detected by the form measuring device 10. In particular, because the V-shaped groove 204 configured by the pair of inclined surfaces is used as the axis line marker 24, the axis line marker 24 can be easily formed by machining or the like on the upper flange portion 202.

The present invention is not limited to the embodiment described above, and includes modifications within a scope capable of achieving the advantages of the present invention. The embodiment uses the V-shaped groove 204, which extends parallel to the abutting side surface 23, as the axis line marker 24. However, the present invention is not limited to a V-shaped groove having a pair of inclined surfaces, and may instead have a unidirectional inclined surface in which one side is a perpendicular surface, or may use a groove that is recessed in an arc shape in cross-section, for example. The present invention is also not limited to a groove that is continuously recessed, and may instead have a projecting portion that is triangular in cross-section, for example. Moreover, the axis line marker need not be continuous along the abutting side surface 23, and may instead be formed at intervals in at least two positions separated from each other along the abutting side surface 23.

Furthermore, the axis line marker is not limited to being formed in the middle of the measurement surface 22, and may instead be formed at a terminal edge of the measurement surface 22, for example, or at some other portion.

Essentially, the axis line marker includes an inclined surface that individually lies along a predetermined axis line direction, and allows the tilt relative to the X axis direction to be detected using the fact that when X axis positions differ despite having the same Y axis position, there is a discrepancy in the Z axis height (corresponding to the tilt). For example, in an adjustment jig 20A illustrated in FIG. 10, an inclined surface 214 is formed on a terminal edge of the upper flange portion 202 on the opposite side from the web portion 203, and an axis line marker 24A is formed by this inclined surface. The axis line marker 24A configured in this way can achieve effects similar to those of the embodiment above.

In the embodiment above, when performing the scanning measurement ("the measurement") that passes through the peak height Hp, the scanning measurement is performed at a site on the threaded shaft 2 that is not covered by the adjustment jig 20. To address a site on the threaded shaft 2 that is covered by the adjustment jig 20, either the adjustment jig 20 is displaced or the threaded shaft 2 is displaced. In contrast, in the adjustment jig 20A illustrated in FIG. 10, a measurement opening 25 is formed in the upper flange portion 202, and the stylus 17 can make contact with the top surface side of the threaded shaft 2 through the measurement opening 25. The measurement surface 22 is present around the periphery of the measurement opening 25, and therefore the leveling adjustment and the measurement of the height Ha can be performed similarly to the embodiment above. Accordingly, with the adjustment jig 20A illustrated in FIG. 10, a scanning measurement of the top surface side of the threaded shaft 2 which is closed off by the adjustment jig 20A can be performed without any special operation.

Figure 11:
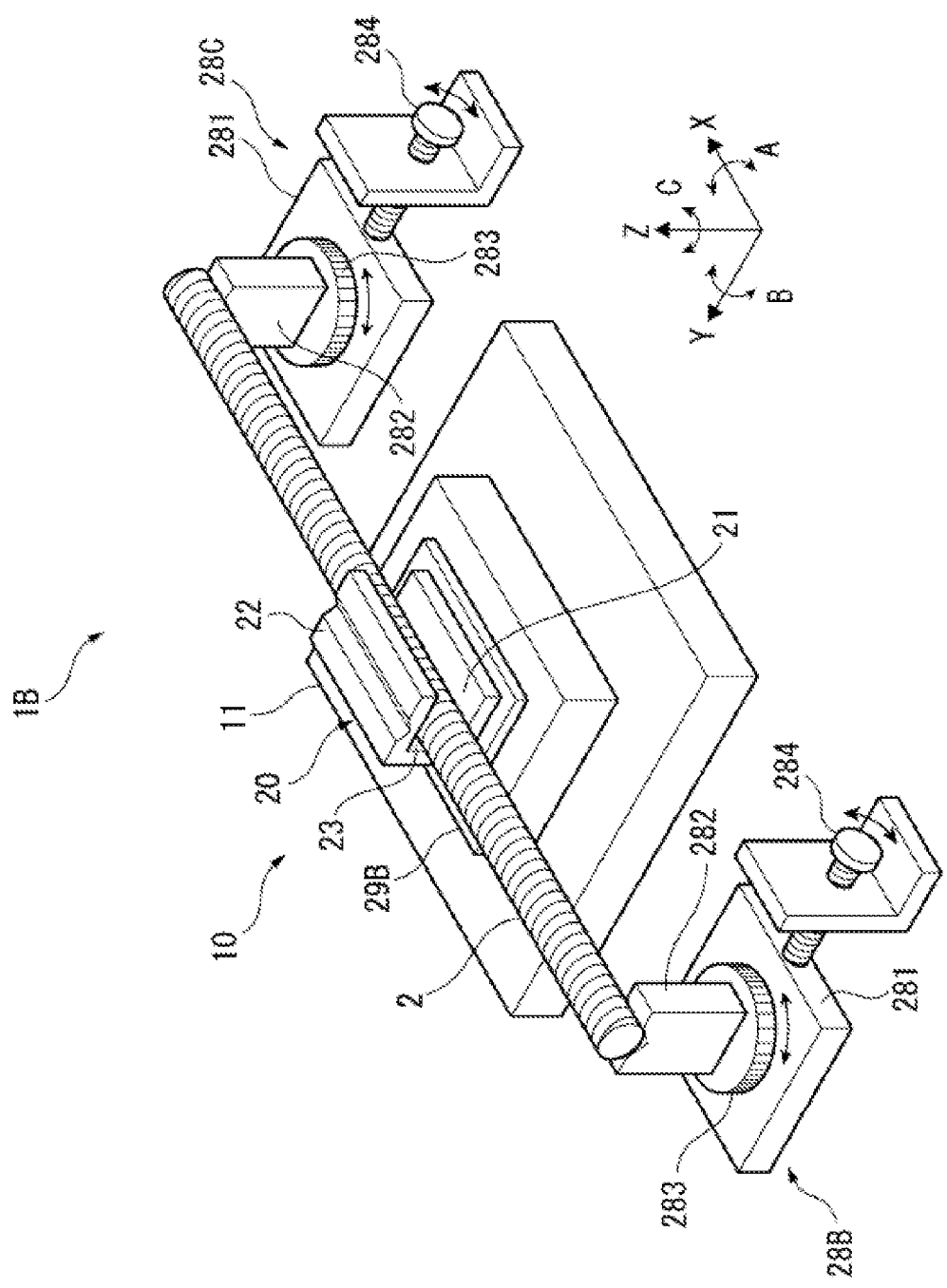
FIG. 11 is a perspective view illustrating an adjustment jig and an elevator mechanism according to another embodiment of the present invention.

In the embodiment above, the pair of support devices 28 are installed on the table 11 and support the areas near the two ends of the threaded shaft 2. However, in cases where the threaded shaft 2 is long, for example, a support device may also be installed separately from the form measuring device 10. In FIG. 11, a threaded shaft measuring device 1B includes the same form measuring device 10 as the embodiment above, and provides the same adjustment jig 20 to the table 11. However, the adjustment jig 20 does not employ the elevator mechanism 29, and is securely installed on the table 11 via a block 29B.

The threaded shaft 2 is supported by a pair of support devices 28B and 28C that are installed on opposite sides of the table 11 from each other. In the present embodiment, the support devices 28B and 28C double as an elevator mechanism. The support device 28B includes a support base 281 installed proximate to the table 11 and a receiving member 282 that receives the threaded shaft 2. The receiving member 282 is supported on the support base 281 by a screw shaft (not shown in the drawings) and an adjustment screw 283. Accordingly, by rotating the adjustment screw 283, Z direction position (i.e., height) adjustment relative to the support base 281 is possible. Moreover, the support device 28B includes a directional adjustment screw 284 that pushes the support base 281 in the Y axis direction, and by rotating the directional adjustment screw 284, the support device 28B can be pushed to displace in the Y axis direction. An operation to displace the support base 281 the opposite way in the Y axis direction is performed manually by the worker. Accordingly, when performing fine displacement, the support base 281 is manually displaced toward the directional adjustment screw 284 in advance, and then minute changes in length to that position are made by pushing the support base 281 with the directional adjustment screw 284.

The support device 28C includes the support base 281, receiving member 282, screw shaft (not shown in the drawings) and adjustment screw 283, and directional adjustment screw 284 similar to those of the support device 28B, and is capable of adjusting the height of the receiving member 282 and of displacing the support device 28C in the Y axis direction, similar to the support device 28B. At this point, the directional adjustment screws 284 of the support devices 28B and 28C are each rotated by the same amount, thereby displacing the support devices 28B and 28C the same distance in the Y axis direction, enabling the threaded shaft 2 to be displaced in parallel in the Y axis direction. Moreover, by shifting only one of the directional adjustment screws 284 of the support devices 28B and 28C, the direction of the threaded shaft 2 can be adjusted. For example, by rotating only the directional adjustment screw 284 of the support device 28C, the support device 28C can be displaced in the Y axis direction while the support device 28B maintains a constant position. Accordingly, the threaded shaft 2 can be rotated about the Z axis (C axis direction), centered on the support device 28B that is situated on the opposite side.

In the threaded shaft measuring device 1B of FIG. 11 having this configuration, by lowering the height of the support devices 28B and 28C, the threaded shaft 2 can be brought into contact with the abutting bottom surface 21 of the adjustment jig 20 (equivalent to process S2 in the embodiment above). In addition, when making the through-feed adjustment of the threaded shaft 2, by operating one or both of the directional adjustment screws 284 of the support devices 28B and 28C, the direction of the threaded shaft 2 can be adjusted (equivalent to the through-feed process S4 in the embodiment above). With regard to other procedures, similar processes to those of the embodiment above can be performed. Therefore, according to the threaded shaft measuring device 1B of FIG. 11, a similar effect to that of the embodiment above can be achieved for a long threaded shaft 2, as well.

The present invention can be used as a threaded shaft measuring device, threaded shaft measuring method, and adjustment jig for measuring various characteristic values of a threaded shaft.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A threaded shaft measuring device comprising:
   a table that supports a threaded shaft to be measured, and that is configured to:
   adjust a rotation position about a perpendicular Z axis,
   adjust a rotation position about an X axis that is horizontal and intersects with the Z axis, and
   adjust a position in a Y axis direction that is horizontal and intersects with the X axis;
   a base that supports the table;
   a head supported on a column that stands upright from the base;
   an arm supported by the head and displaceable in the horizontal X axis direction;
   a stylus that is installed on the arm and that performs scanning measurement of a surface of the threaded shaft;
   an adjustment jig that is engageable with the threaded shaft and installed on the table; and
   an elevator that brings the adjustment jig into contact with the threaded shaft and is installed on the table, wherein the adjustment jig comprises:
   an abutting bottom surface that is engageable with the threaded shaft from below;
   an abutting side surface that engageable with the threaded shaft from the side;
   a measurement surface that is installed at a predetermined height from and is parallel to the abutting bottom surface; and
   an axis line marker that allows a tilt relative to the X axis to be detected.

2. The threaded shaft measuring device according to claim 1, wherein:
   the adjustment jig has a general "C"-shaped cross-section, with a lower flange portion and an upper flange portion connected by a web portion,
   the abutting bottom surface is formed by a flat top surface of the lower flange portion,
   the abutting side surface is formed by a flat inner surface of the web portion, and
   the measurement surface is formed by a flat top surface of the upper flange portion.

3. The threaded shaft measuring device according to claim 1, wherein:
   the axis line marker is one of a recessed or projecting portion formed on the measurement surface, and
   the one of the recessed or projecting portion is one of continuous or arrayed along an axis line that is parallel to the abutting side surface.

4. The threaded shaft measuring device according to claim 2, wherein:
   the axis line marker is one of a recessed or projecting portion formed on the measurement surface, and
   the one of the recessed or projecting portion is one of continuous or arrayed along an axis line that is parallel to the abutting side surface.

5. A threaded shaft measuring method using:
   a table that supports a threaded shaft to be measured, and that is capable of adjusting a rotation position about a perpendicular Z axis, adjusting a rotation position about an X axis that is horizontal and intersects with the Z axis, and adjusting a position in a Y axis direction that is horizontal and intersects with the X axis;
   an adjustment jig having an abutting bottom surface that is capable of making contact with the threaded shaft from below, an abutting side surface that is capable of making contact with the threaded shaft from the side, a measurement surface that is installed at a predetermined height from and is parallel to the abutting bottom surface, and an axis line marker that enables a tilt relative to the X axis to be detected; and an elevator that is installed on the table and brings the adjustment jig into contact with the threaded shaft, the method comprising:

actuating the elevator:
- to cause the adjustment jig and the threaded shaft to approach each other,
- to bring the abutting bottom surface into contact with the threaded shaft from below, and
- to bring the abutting side surface into contact with the threaded shaft from the side, measuring:
- a height of the measurement surface, and
- a plurality of points on the axis line marker;

detecting the tilt of the adjustment jig relative to the X axis;

performing through-feed adjustment based on the detected tilt;

actuating the elevator to move the adjustment jig away from the threaded shaft;

performing scanning measurement of the top side of the threaded shaft in the X axis direction;

performing and vertex finding adjustment based on an amount of offset in the Y axis direction;

thereafter once again performing the scanning measurement;

acquiring profile shape data for the threaded shaft from the scanning measurement results; and calculating a height of the abutting bottom surface based on the height of the measurement surface.

6. An adjustment jig for use with a threaded shaft measuring system having table that supports a threaded shaft to be measured, and that is capable of adjusting a rotation position about a perpendicular Z axis, adjusting a rotation position about an X axis that is horizontal and intersects with the Z axis, and adjusting a position in a Y axis direction that is horizontal and intersects with the X axis, the threaded shaft measuring system further having an elevator installed on the table and brings the adjustment jig into contact with the threaded shaft, the adjustment jig comprising:

an abutting bottom surface that is engageable with the threaded shaft from below;

an abutting side surface that is engageable with the threaded shaft from the side;

a measurement surface that is installed at a predetermined height from and is parallel to the abutting bottom surface; and an axis line marker that provides for the detection of a tilt relative to the X axis, wherein:

the elevator installed on the table is configured to bring the adjustment jig into contact with the threaded shaft, the elevator actuable:
- to cause the adjustment jig and the threaded shaft to approach each other,
- to bring the abutting bottom surface into contact with the threaded shaft from below, and
- to bring the abutting side surface into contact with the threaded shaft from the side, a height of the measurement surface and a plurality of points on the axis line marker are measured, the tilt of the adjustment jig relative to the X axis is detected, and through-feed adjustment is performed based on the detected tilt, the elevator moves the adjustment jig away from the threaded shaft, scanning measurement of the top side of the threaded shaft is performed in the X axis direction, vertex finding adjustment is performed based on an amount of offset in the Y axis direction, after which the scanning measurement is again performed, profile shape data for the threaded shaft is acquired from the scanning measurement results, and a height of the abutting bottom surface calculated from the height of the measurement surface.

* * * * *